(12) United States Patent
Vasseur

(10) Patent No.: US 7,586,841 B2
(45) Date of Patent: *Sep. 8, 2009

(54) SYSTEM AND METHOD FOR PROTECTING AGAINST FAILURE OF A TE-LSP TAIL-END NODE

(75) Inventor: Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 715 days.

This patent is subject to a terminal disclaimer.

(21) Appl. No.: 11/141,567

(22) Filed: May 31, 2005

(65) Prior Publication Data

US 2006/0268682 A1    Nov. 30, 2006

(51) Int. Cl.
  *G01R 31/08*    (2006.01)
(52) U.S. Cl. ...................................... 370/218; 370/221
(58) Field of Classification Search ................. 370/217, 370/221, 218
  See application file for complete search history.

(56) References Cited

U.S. PATENT DOCUMENTS

| | | | |
|---|---|---|---|
| 6,628,649 B1 | 9/2003 | Raj et al. | |
| 6,751,190 B1 | 6/2004 | Swallow | |
| 6,778,492 B2 | 8/2004 | Charny et al. | |
| 6,831,898 B1 | 12/2004 | Edsall et al. | |
| 6,850,486 B2 | 2/2005 | Saleh et al. | |
| 2003/0126287 A1 | 7/2003 | Charny et al. | |
| 2003/0233595 A1 | 12/2003 | Charny et al. | |
| 2004/0090913 A1 | 5/2004 | Scudder et al. | |
| 2004/0196827 A1 | 10/2004 | Xu et al. | |
| 2005/0083928 A1 | 4/2005 | Sivabalan et al. | |
| 2005/0097219 A1* | 5/2005 | Goguen et al. | 709/238 |
| 2005/0111351 A1* | 5/2005 | Shen | 370/217 |

OTHER PUBLICATIONS

Pan et al., Fast Reroute Extensions to RSVP-TE for LSP Tunnesl, (draft-ietf-mpls-rsvp-lsp-fastreroute-07.txt), Dec. 9, 2004.*
Vasseur et al., U.S. Appl. No. 11/011,814, entitled an Efficient Mechanism for Fast Recovery in Case of Border Router Node Failure in a Computer Network, filed Dec. 14, 2004.

(Continued)

*Primary Examiner*—Seema S Rao
*Assistant Examiner*—Christine Duong
(74) *Attorney, Agent, or Firm*—Cesari and McKenna LLP

(57) ABSTRACT

A technique protects against failure of a tail-end node of a Traffic Engineering (TE) Label Switched Path (LSP) in a computer network. According to the protection technique, a node along the TE-LSP that is immediately upstream to the protected tail-end node and that is configured to protect the tail-end node (i.e., the "point of local repair" or PLR) learns reachable address prefixes (i.e., "protected prefixes") of next-hop routers from the tail-end node (i.e., "next-next-hops," NNHOPs to the protected prefixes from the PLR). The PLR creates a backup tunnel to each NNHOP that excludes the tail-end node, and associates each backup tunnel with one or more protected prefixes accordingly. When the tail-end node fails, Fast Reroute is triggered, and the protected prefix traffic (from the TE-LSP) is rerouted by the PLR onto an appropriate backup tunnel to a corresponding NNHOP. Notably, the PLR performs a penultimate hop popping (PHP) operation prior to forwarding the traffic along the backup tunnel(s).

15 Claims, 9 Drawing Sheets

OTHER PUBLICATIONS

Vasseur et al., U.S. Appl. No. 11/012,044, entitled Border Router Protection with Backup Tunnel Stitching in Computer Network, filed Dec. 14, 2004.

Callon, R., RFC 1195, entitled Use of OSI ISIS for routing in TCP/IP and Dual Environments, Dec. 1990, pp. 1-80.

Rekhter, Y., RFC 1771, entitled A Border Gateway Protocol 4 (BGP-4), Mar. 1995, pp. 1-54.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Pan, P. et al., Internet Draft entitled Fast Reroute Extensions to RSVP-TE for LSP Tunnels (draft-ietf-mpls-rsvp-lsp-fastreroute-07.txt), Feb. 2005, pp. 1-35.

Vasseur, et al., Internet Draft entitled RSVP Path Computation Request and Reply Messages (draft-vasseur-mpls-computation-rsvp-05.txt, Jul. 2004, pp. 1-31.

Perlman, Radia, Interconnections Second Edition: Bridges, Routers, Switches, and Internetworking Protocols, Addison Wesley, 1999, Section 12.2.4, pp. 317-319.

* cited by examiner

SYSTEM AND METHOD FOR PROTECTING AGAINST FAILURE OF A TE-LSP TAIL-END NODE

BACKGROUND OF THE INVENTION

1. Field of the Invention

The present invention relates to computer networks and more particularly to protecting against node failure in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address (e.g., stored in a header of the packet) may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes can construct the same "view" of the network topology by aggregating the received lists of neighboring nodes and cost values.

To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled RSVP-TE: *Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other path computation requests from other PCCs. It is important to note that when one PCE sends a request to another PCE, it acts as a PCC.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in its entirety. In the case of traffic engineering applications, RSVP signaling (with Traffic Engineering extensions) is used to establish a TE-LSP and to convey various TE-LSP attributes to routers, such as border routers, along the TE-LSP obeying the set of required constraints whose path may have been computed by various means.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

A common practice in TE-enabled networks consists of deploying a mesh of TE-LSPs between a plurality of edge devices (provider edge, or PE routers) through a core network of fewer (generally large capacity) routers (provider, or P routers). In a mesh between PE routers (e.g., a "full mesh"), each PE router on one side of the core is connected to each PE router on the other side of the core via one or more TE-LSPs. The mesh of TE-LSPs provides various benefits within the network, as known to those skilled in the art. In certain network configurations (e.g., with a large number of PE routers), however, this results in a large number of TE-LSPs throughout the network. For example, in the event there are 100 PE routers on each side of the core network, a total of 9,900

TE-LSPs are necessary to create a full mesh with unidirectional TE-LSPs. Generally, there are more (e.g., 5 to 10 times more) PE routers than there are P routers in the network, so one solution to limit the number of TE-LSPs in the network has been to create a mesh of TE-LSPs between the P routers, and not the PE routers. This may significantly reduce the number of TE-LSPs, such as by a factor of, e.g., 25-100. The PE routers may then communicate with the P routers through conventional routing, e.g., IP/MPLS routing.

Occasionally, a network element (e.g., a node or link) will fail, causing redirection of the traffic that originally traversed the failed network element to other network elements that bypass the failure. Generally, notice of this failure is relayed to the nodes in the same domain through an advertisement of the new network topology, e.g., an IGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, including, inter alia, Fast Reroute (FRR), e.g., MPLS TE FRR. An example of MPLS TE FRR is described in Pan, et al., *Fast Reroute Extensions to RSVP-TE for LSP Tunnels* <draft-ietf-mpls-rsvp-lsp-fastreroute-07.txt>, Internet Draft, February 2005, which is hereby incorporated by reference as though fully set forth herein.

FRR has been widely deployed to protect against network element failures, where "backup tunnels" are created to bypass a protected network element (e.g., links, shared risk link groups (SRLGs), and nodes). When the network element fails, traffic is quickly rerouted over a backup tunnel to bypass the failed element, or more particularly, in the case of MPLS, a set of TE-LSP(s) is/are quickly rerouted. Specifically, the point of local repair (PLR) configured to reroute the traffic inserts ("pushes") a new label for the backup tunnel, and the traffic is rerouted accordingly. Once the failed element is bypassed, the backup tunnel label is removed ("popped"), and the traffic is routed along the original path according to the next label (e.g., that of the original TE-LSP). Notably, the backup tunnel, in addition to bypassing the failed element along a protected primary TE-LSP, the must also intersect the primary TE-LSP, i.e., it must begin and end at nodes along the protected primary TE-LSP. As such, there is currently no known method to protect against a failure of the TE-LSP tail-end node using FRR.

There remains a need, therefore, for a system and method for protecting against a failure of a tail-end node of a TE-LSP, e.g., using FRR and backup tunnels. There also remains a need to dynamically select an appropriate tail-end node backup tunnel for each destination address prefix. Selecting an improper backup tunnel could result in routing loops, black holing, time delay, or other undesirable outcomes.

SUMMARY OF THE INVENTION

The present invention is directed to a technique for protecting against failure of a tail-end node of a Traffic Engineering (TE) Label Switched Path (LSP) in a computer network. According to the protection technique, a node along the TE-LSP that is immediately upstream to the protected tail-end node and that is configured to protect the tail-end node (i.e., the "point of local repair" or PLR) learns reachable address prefixes (i.e., "protected prefixes") of next-hop routers from the tail-end node (i.e., "next-next-hops," NNHOPs to the protected prefixes from the PLR). The PLR creates a backup tunnel to each NNHOP that excludes the tail-end node, and associates each backup tunnel with one or more protected prefixes accordingly. When the tail-end node fails, Fast Reroute is triggered, and the protected prefix traffic (from the TE-LSP) is rerouted by the PLR onto an appropriate backup tunnel to a corresponding NNHOP. Notably, the PLR performs a penultimate hop popping (PHP) operation prior to forwarding the traffic along the backup tunnel(s).

In accordance with one aspect of the present invention, the PLR computes a shortest path tree (SPT) rooted at the protected tail-end node to learn address prefixes that are reachable from the tail-end node, as well as next-hops used to reach those prefixes. These learned prefixes and next-hops (NNHOPs to the PLR) are stored in a backup routing table (BRT) at the PLR that is maintained current in the event of protected tail-end node failure. The PLR then creates backup tunnels to the NNHOPs that are diversely routed around the protected tail-end node (e.g., by traversing another node or nodes between the PLR and NNHOPs). These backup tunnels are illustratively stored in the BRT of the PLR, so that conventional routing (along the TE-LSP) may still be performed by the PLR using its routing table.

In accordance with another aspect of the present invention, once the PLR determines that the protected tail-end node has failed, Fast Reroute is triggered, and all traffic destined to a protected prefix is rerouted by the PLR (after performing a PHP operation) onto an appropriate backup tunnel to a corresponding NNHOP, e.g., according to the BRT. Upon learning of the tail-end node failure, a head-end node of the TE-LSP may attempt to create or use an alternate TE-LSP to reach the protected prefixes, or revert to native (IP) routing if no TE-LSP is available. Also, in the event the head-end node tears down the protected TE-LSP, the PLR may tear down the corresponding backup tunnel(s) and revert to native routing.

Advantageously, the novel technique protects against the failure of a tail-end node of a TE-LSP in a computer network using Fast Reroute and backup tunnels. By creating backup tunnels between PLR and NNHOP routers, the inventive technique provides Fast Reroute protection of the tail-end node that requires minimal configuration and avoids the deployment of TE-LSPs and/or backup tunnels from head-end nodes to every next-hop of the tail-end node (NNHOPs of the PLR).

BRIEF DESCRIPTION OF THE DRAWINGS

The above and further advantages of the invention may be better understood by referring to the following description in conjunction with the accompanying drawings in which like reference numerals indicate identical or functionally similar elements, of which.

DETAILED DESCRIPTION OF AN ILLUSTRATIVE EMBODIMENT

Figure 1:
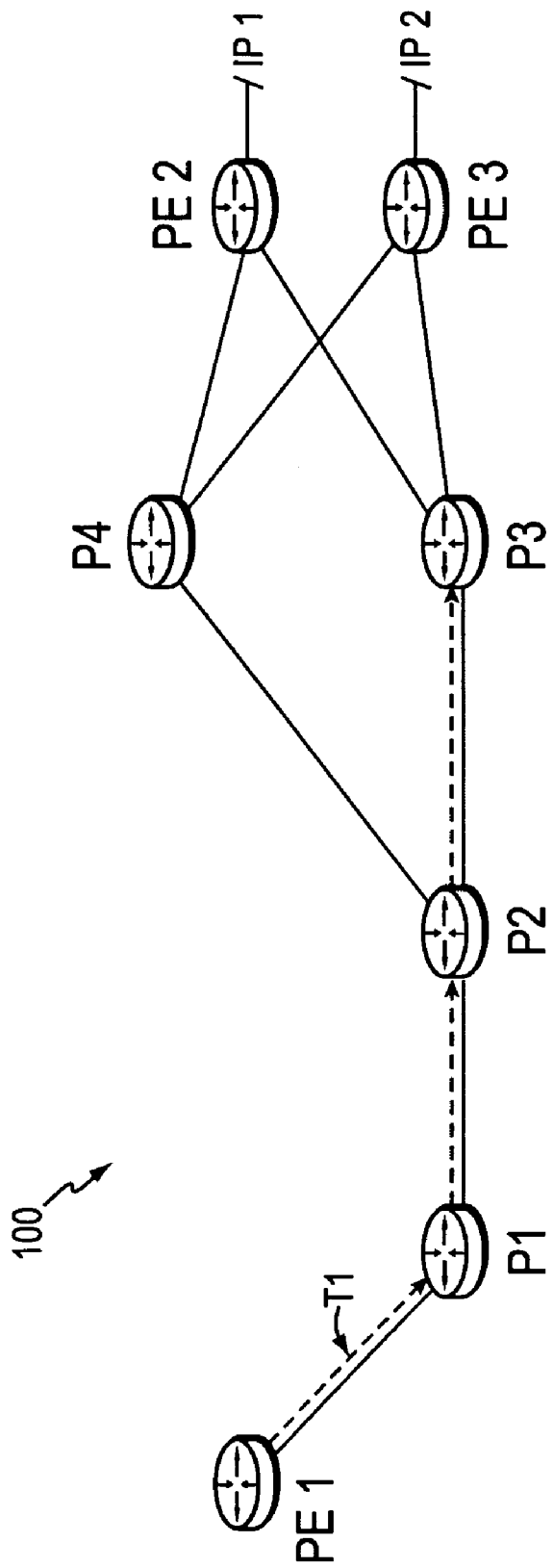
FIG. 1 is a schematic block diagram of an exemplary computer network that may be used in accordance with the present invention.

FIG. 1 is a schematic block diagram of an exemplary computer network 100 comprising edge devices (provider edge routers) PE1 interconnected to PE2 and PE3 by provider (core) routers P1-P4 (e.g., through links as shown). A core router is generally defined as a router that is part of a core or "backbone" (i.e., the collection of provider routers P1-P4) that serves as a "pipe" through which all traffic from peripheral networks must pass on its way to other peripheral networks. Because of this, the core routers (and the links connecting them) are commonly designed to accommodate a high volume of traffic, such as, e.g., links with 2.5 GB (gigabytes) or 10 GB of bandwidth (such as optical connections OC48 or OC192, respectively). The edge routers PE1-PE3 may connect to the peripheral networks, and act as access points (points of presence, POP) to the computer network for other devices of the peripheral network. Illustratively, address prefixes IP1 and IP2 are reachable via routers PE2 and PE3, respectively. Notably, the core may be organized as a meshed network, in which the devices are organized in a manageable, segmented manner known to those skilled in the art. Moreover, each edge router (PE1-PE3) may be connected to multiple core routers (e.g., in a "mesh" fashion) over a Local Area Network (LAN), providing redundancy for each edge router to the core. Those skilled in the art will understand that any number of routers and nodes may be used in the computer network, and that the view shown herein is for simplicity. For example, more edge routers may be connected to the core (provider routers P1-P4) in a manner similar to PE1-PE3, e.g., with mesh connections to the core. Those skilled in the art will also understand that while the present invention is described in terms of a core network with P and PE routers, any network configuration and any arrangement of routers may be used in accordance with the present invention.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
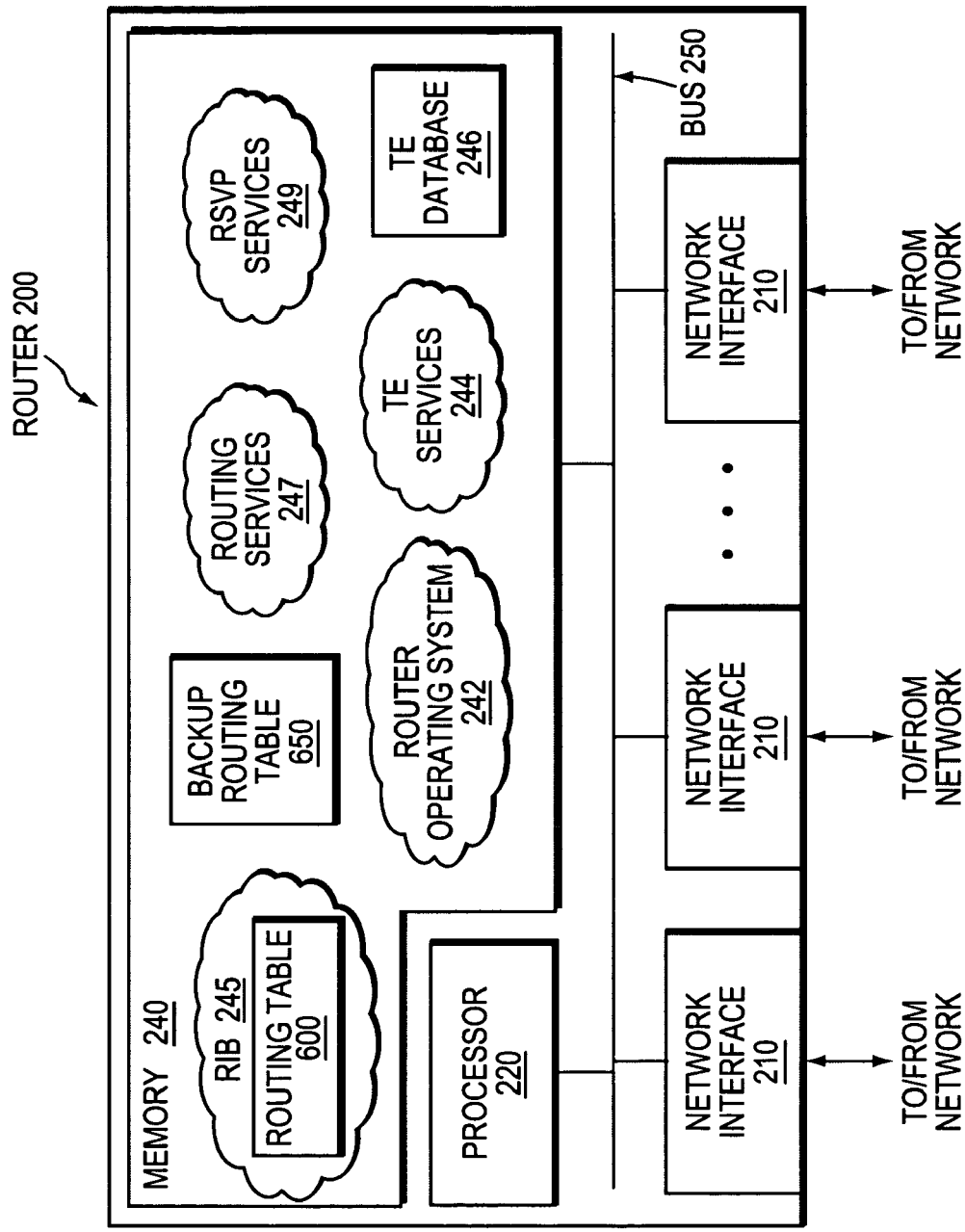
FIG. 2 is schematic block diagram of an exemplary router that may be advantageously used with the present invention.

FIG. 2 is a schematic block diagram of an exemplary router 200 that may be advantageously used with the present invention, e.g., as an edge router or a core router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as TE Database (TED) 246, routing table 600 and backup routing table (BRT) 650. A router operating system 242, portions of which is typically resident in memory 240 and executed by the processor, functionally organizes the router by, inter alia, invoking network operations in support of software processes and/or services executing on the router. These software processes and/or services include Router Information Base (RIB) 245, routing services 247, Traffic Engineering (TE) services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 246 is illustratively resident in memory 240 and used to store TE information provided by the routing protocols, such as IGP and/or RSVP (with TE extensions, e.g., as described herein), including, inter alia, lists as described herein. The TED 246 is illustratively maintained and managed by TE services 244.

Changes in the network topology may be communicated among routers 200 using a link-state protocol, such as the conventional OSPF and IS-IS protocols. Suppose, for example, that a communication link fails or a cost value associated with a network node changes. Once the change in the network's state is detected by one of the routers, that router may flood an IGP Advertisement communicating the change to the other routers in the network. In this manner, each of the routers eventually "converges" to an identical view of the network topology.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop. In some network configurations, one hop prior to the network egress, a penultimate hop popping (PHP) operation may be performed. Particularly, because the hop prior to the network egress (the penultimate hop) is attached to the network egress, the label is no longer needed to assure that the traffic follows a particular path to the network egress. As such, the PHP-enabled device "pops" the labels from the traffic before forwarding the traffic to the network egress, e.g., using conventional or native (IP) routing, thereby alleviating the task of removing the labels at the network egress.

The paths taken by packets that traverse the network in this manner are referred to as label switched paths (LSPs) or Traffic Engineering (TE)-LSPs. An example TE-LSP is shown as the dashed lines and arrows (T1) between a head-end node (PE1) and a tail-end node (P3) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al., *RSVP Path Computation Request and Reply Messages* <draft-vasseur-mpls-computation-rsvp-05.txt>, Internet Draft, July 2004, or in Vasseur, et al., *Path Computation Element (PCE) Communication Protocol (PCEP)-Version 1*-<draft-vasseur-pce-pcep-00.txt>, Internet Draft, May 2005, both contents of which are hereby incorporated by reference in their entirety. It should be understood that the use of RSVP or PCEP serves only as an example, and that other communication protocols may be used in accordance with the present invention.

In accordance with RSVP, to request a data flow (TE-LSP) between a sender (e.g., head-end node PE1) and a receiver (e.g., tail-end node P3), the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow.

Figure 3:
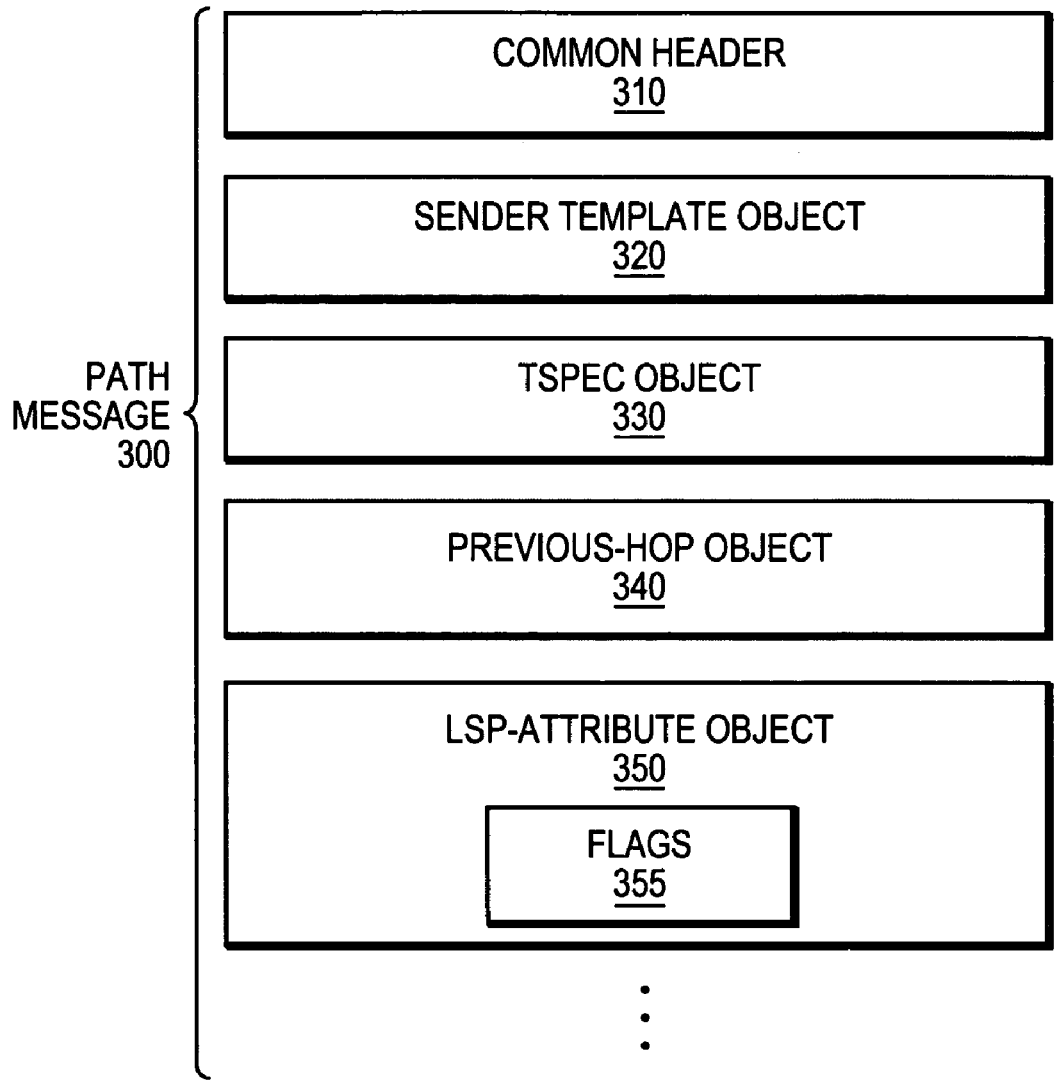
FIG. 3 is a schematic block diagram of portions of a path request message that may be advantageously used with the present invention.

FIG. 3 is a schematic block diagram of portions of a path request (e.g., RSVP Path) message 300 that may be advantageously used with the present invention. Message 300 contains, inter alia, a common header 310, a sender template object 320, a traffic specification (Tspec) object 330, a previous-hop object 340, and an LSP-Attribute object 350. The sender template object 320 holds information about the sender, such as an address and port associated with the sender, while Tspec object 330 holds information that, e.g., defines various traffic characteristics of a data flow between the sender and a receiver. Previous-hop object 340 holds information relating to a previous hop (node) in the flow between the sender and receiver. The LSP-Attribute object 350 is used to signal attributes and/or information regarding an LSP. To communicate this information, LSP-Attribute object 350 may include various type/length/value (TLV) encoding formats (not shown), and may also have a flags field 355, which may be a separate field within the object 350 or within any number of the TLVs, as will be understood by those skilled in the art. An example of an LSP-Attribute object is further described in Farrel, et al., *Encoding of Attributes for Multi-protocol Label Switching (MPLS) Label Switched Path (LSP) Establishment Using RSVP-TE* <draft-ietf-mpls-rsvpte-attributes-04.txt>, Internet Draft, July 2004, which is hereby incorporated by reference as though fully set forth herein.

In accordance with the RSVP, a receiver establishes the TE-LSP between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the TE-LSP, and provide a TE-LSP label.

Figure 4:
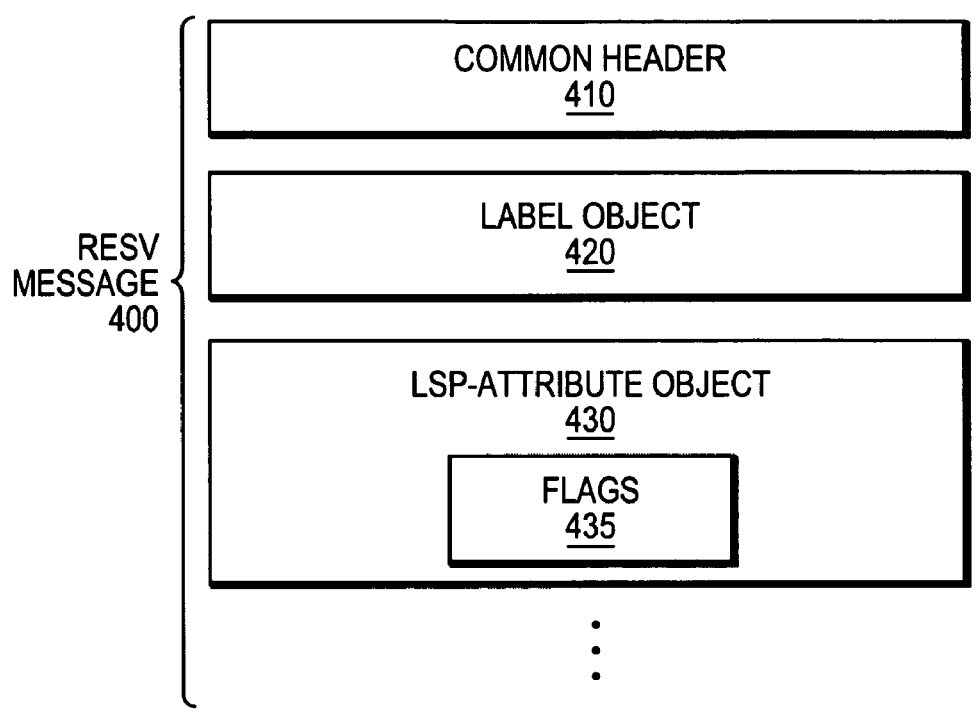
FIG. 4 is a schematic block diagram of portions of a reservation request message that may be advantageously used with the present invention.

FIG. 4 is a schematic block diagram of portions of a reservation request (e.g., RSVP Resv) message 400 that may be advantageously used with the present invention. Resv message 400 contains, inter alia, a common header 410, a label object 420, and an LSP-Attribute object 430 and flags field 435, as described above. It should be noted that other objects defined by, e.g., the RSVP, may be included in the reservation request message, such as a session object which may contain address information of the receiver and a filter spec object which may contain address information of the sender. It should be noted that in accordance with RSVP signaling, the state of the RSVP is refreshed on a timed interval, e.g., every thirty seconds, in which RSVP Path and Resv messages are exchanged. This timed interval is configurable by a system administrator.

Figure 5:
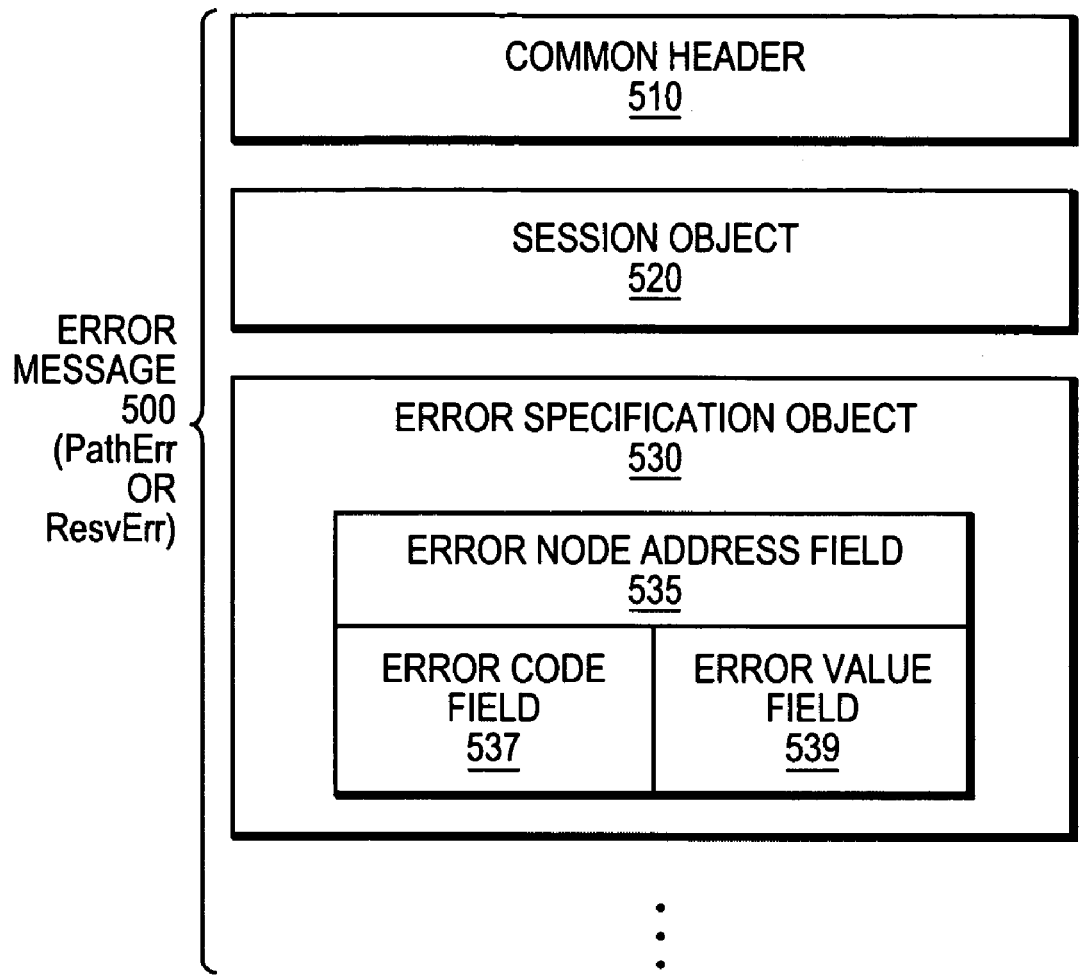
FIG. 5 is a schematic block diagram of an error message that may be advantageously used with the present invention.

If an intermediate node in the path between the sender and receiver acquires a Path message 300 or Resv message 400 for a new or established reservation (TE-LSP) and encounters an error (e.g., insufficient resources, failed network element, etc.), the intermediate node generates and forwards a path or reservation error (PathErr or ResvErr) message to the sender or receiver, respectively. FIG. 5 is a schematic block diagram of an error message 500 that may be advantageously used with the present invention, e.g., as a PathErr or ResvErr message.

Error message 500 comprises in part a common header 510, a session object 520, and an error specification object 530. The session object 520 identifies, inter alia, the destination address of the message (sender or receiver). The error specification object 530 contains, inter alia, an error node address field 535, an error code field 537, and an error value field 539. The error node address field 535 holds a value that represents an address (e.g., IP address) of a node in the path that detected the error (e.g., insufficient resources). The error code field 537 holds a value that describes the error and the error value field 539 holds a value that represents additional information about the error.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To obviate delays associated with updating routing tables when attempting to avoid a failed network element (i.e., during convergence), some networks have employed MPLS TE fast reroute (FRR). MPLS FRR is a technique that may be used to quickly reroute traffic around failed network elements in a TE-LSP. MPLS FRR is further described, for example, by Fast Reroute Extensions to RSVP-TE for LSP Tunnels, as incorporated by reference above. According to the technique, one or more network elements (e.g. links or nodes) in a network are protected by backup tunnels following an alternate path. If a failure occurs on a protected link or node, TE-LSPs (and consequently the traffic that they carry) are locally rerouted onto an appropriate alternate path (e.g., a "backup tunnel") by the node immediately upstream from the failure. The backup tunnel acts as an FRR path for the primary TE-LSP and obviates delays associated with other measures, such as tearing down the primary TE-LSP after having gracefully rerouted the TE-LSPs affected by the failure, should an alternate path around the failed network element exist. In the event of a failure of a protected element the head-end node of the backup tunnel (or a "point of local repair," PLR) may quickly begin routing traffic over the backup tunnel with minimal disruption to traffic flow. Those skilled in the art will understand that MPLS FRR is one example of link or node failure protection, and that other known correction mechanisms may be used in accordance with the present invention. As mentioned above, however, in order for failure protection to function properly within a TE-LSP, the backup tunnel must intersect the protected primary TE-LSP, which means the tail-end node of the primary TE-LSP may not be protected in the conventional manner.

The present invention is directed to a technique for protecting against failure of a tail-end node of a TE-LSP in a computer network. According to the protection technique, a node along the TE-LSP that is immediately upstream to the protected tail-end node and that is configured to protect the tail-end node (i.e., the PLR) learns reachable address prefixes (i.e., "protected prefixes") of next-hop routers from the tail-end node (i.e., "next-next-hops," NNHOPs to the protected prefixes from the PLR). The PLR creates a backup tunnel to each NNHOP that excludes the tail-end node, and associates each backup tunnel with one or more protected prefixes accordingly. When the tail-end node fails, Fast Reroute is triggered, and the protected prefix traffic (from the TE-LSP) is rerouted by the PLR onto an appropriate backup tunnel to a corresponding NNHOP. Notably, the PLR performs a PHP operation prior to forwarding the traffic along the backup tunnel(s).

In accordance with one aspect of the present invention, the PLR computes a shortest path tree (SPT) rooted at the protected tail-end node to learn address prefixes that are reachable from the tail-end node, as well as next-hops used to reach those prefixes (i.e., the next-hops that would have been selected by the tail-end node P3). Specifically, the PLR (P2) performs a shortest path first (SPF) computation rooted at the protected tail-end node P3 to create the SPT. The PLR traverses the SPT to locate a sub-branch starting at each NNHOP and tags each address prefix downstream from the NNHOP (i.e., away from the protected tail-end node) with a value corresponding to a loopback address of the NNHOP.

Figure 6:
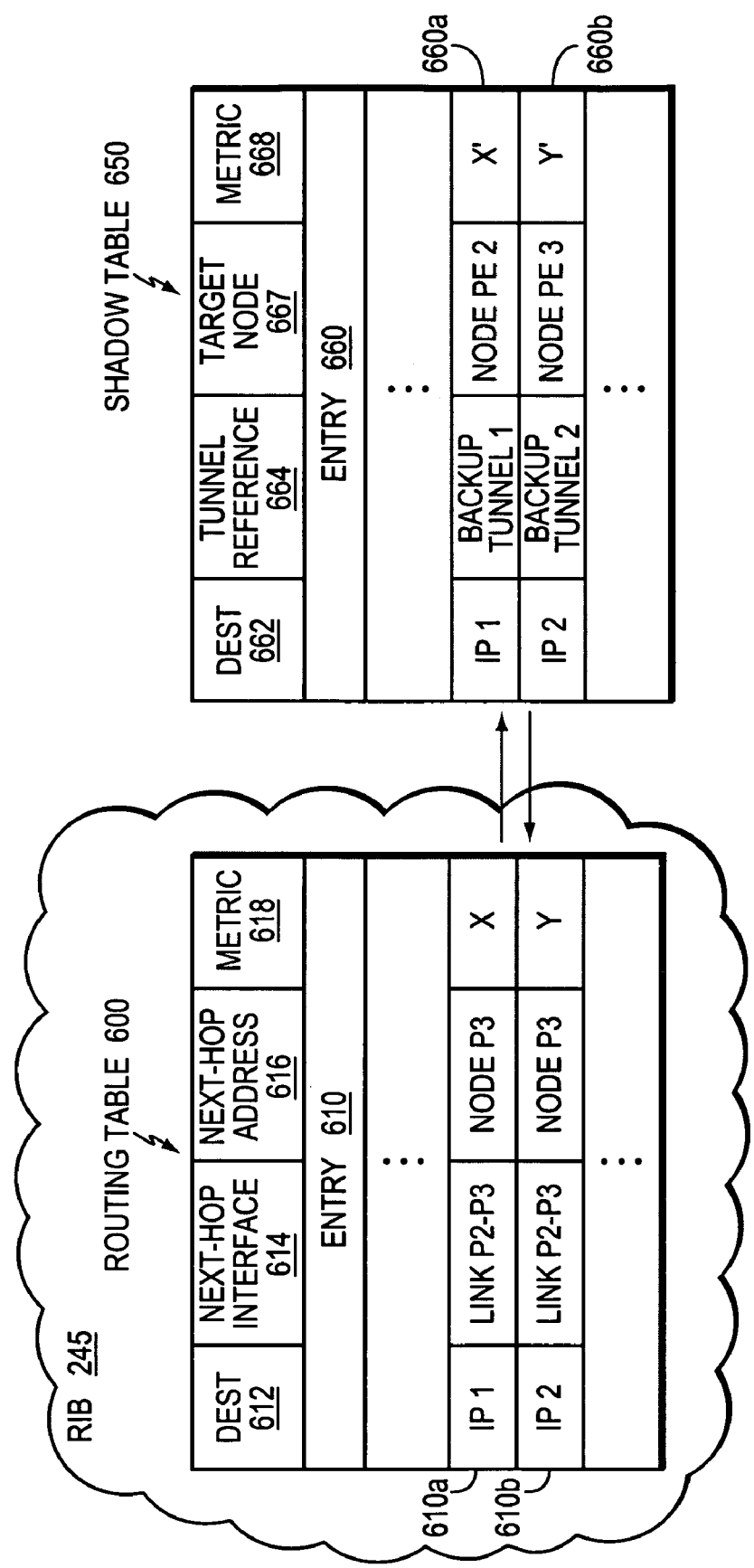
FIG. 6 is schematic block diagram of exemplary routing table and backup routing table that may be advantageously used with the present invention.

These learned (tagged) prefixes and appropriate next-hops (NNHOPs to the PLR) are stored in a backup routing table (BRT) at the PLR that is maintained current in the event of protected tail-end node failure. FIG. 6 is schematic block diagram of exemplary routing table 600 that may be advantageously used with the present invention. Routing table 600 is illustratively stored in memory 240 and includes one or more entries 610, each comprising a plurality of fields for storing a reachable destination address 612, a next-hop interface 614 and next-hop address 616 to reach that destination, and an associated metric (e.g., cost) 618 of reaching the destination. The routing table 600 is illustratively maintained and managed by RIB 245. To that end, the RIB 245 maintains copies of routes (paths) provided by the routing protocols, such as IGP, in order to compute best paths/routes for installation into the routing table 600.

For example, assume that a destination address prefix IP1 is reachable from P2 via P3. A destination address field 612 of entry 610a contains the reachable address IP1, and the next-hop fields 614, 616, are populated with, e.g., link P2-P3 and a loopback address of node P3, respectively. Note that a loopback address of the next hop node is used as the next-hop address for many reasons, including as a way to avoid depending upon the availability of network interfaces of that node. The metric or cost to reach IP1 is the cost of all links to the reachable address, denoted as "X." Further assume that a destination address prefix IP2 is reachable from P2 again via P3. Destination address field 612 of entry 610b contains the reachable address IP2, and the next-hop fields 614, 616, are populated with the same information as above, and the cost to reach IP2 is denoted as Associated with the routing table 600 is backup routing table (BRT) 650. As noted, the BRT 650 illustratively stores reachability information of the protected tail-end node (P3), to enable conventional routing operations at the PLR. The fields of the BRT 650 are populated by the information obtained from the PLR's computation of the SPT rooted at the tail-end node P3. The BRT 650 essentially comprises the same format as routing table 600, but with destination address prefixes reachable via the NNHOPs (next-hops to the tail-end node). Specifically, each entry 660 of the BRT 650 may include a plurality of fields for storing one or more destination prefixes 662 reachable from the NNHOP, a reference to a backup tunnel 664 to the NNHOP (described below), the address of the NNHOP (target node) 667, and (optionally) a cost metric 668, e.g., X' and Y'. Notably, the cost may or may not be known by the PLR (e.g., in interdomain situations), in which case such cost would not be present in the BRT 650.

Using the reachability information, the PLR calculates and creates backup tunnels (e.g., TE-LSPs) to the NNHOPs that are diversely routed around the protected tail-end node (e.g., by traversing another node or nodes between the PLR and NNHOPs). To ensure that the tunnels are diversely routed from the protected tail-end node (P3), network element exclusion or PCE-based path computation can be used. In FIG. 1, a diverse backup tunnel manifests as traversing P4. It should be noted that any other node or router (not shown) that is separate (diverse) from the protected tail-end node may be used.

These backup tunnels are illustratively stored in the BRT of the PLR, so that conventional routing (e.g., TE-LSP routing along T1 in accordance with MPLS) may still be performed by the PLR using its routing table. Within BRT 650, Tunnel Reference field 664 contains the appropriate backup tunnel identifiers (and possibly the appropriate label) corresponding to the learned address prefixes. Notably, BRT 650 may be configured as a single table for all reachable prefixes and all corresponding NNHOPs, or may instead be a table for each NNHOP. Also note that an indication (e.g., a flag or value) may be used to notify the PLR which routing table to use, such as, e.g., an indication as to whether the routing is in a steady-state or backup (FRR) situation, as described herein.

Figure 7:
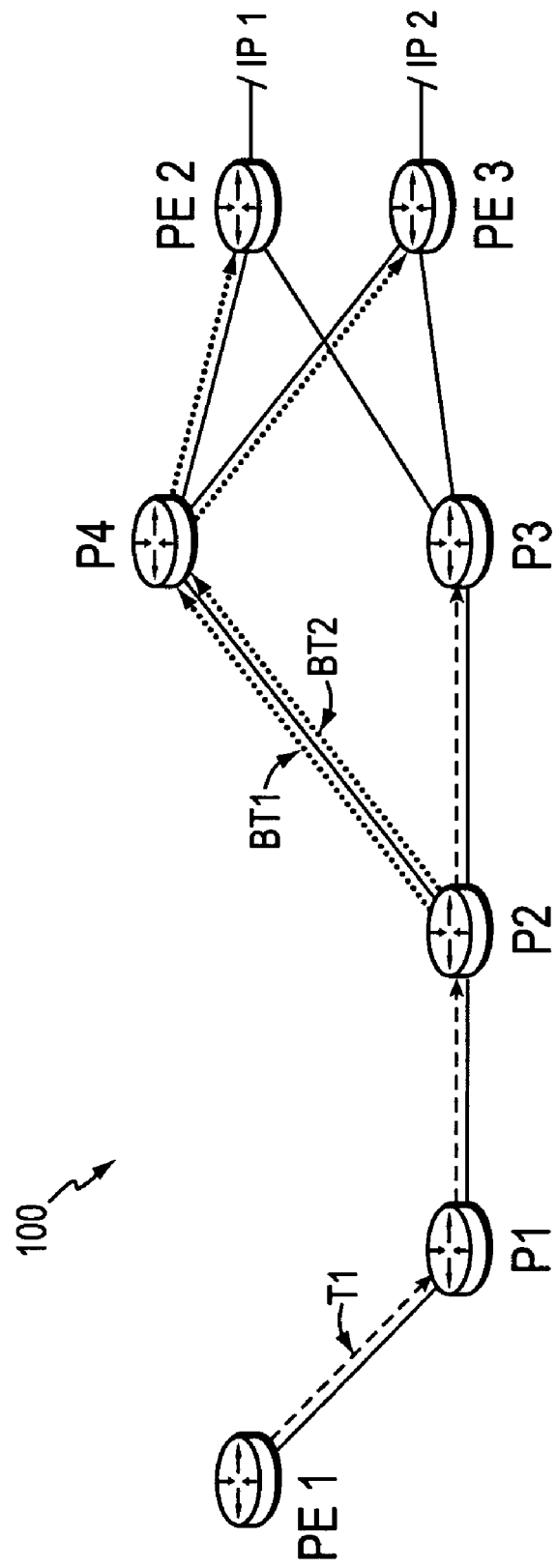
FIG. 7 is a schematic block diagram of an exemplary computer network as in FIG. 1 with illustrative backup tunnels in accordance with the present invention.

FIG. 7 is a schematic block diagram of an exemplary computer network 100 as in FIG. 1 with illustrative backup tunnels in accordance with the present invention. Notably, the backup tunnels are created according to the methods described above. For example, BT1 (shown as a dotted line) is a backup tunnel from head-end router P2 (the PLR) through P4 (diverse router) to tail-end node PE2 (NNHOP to IP1). In addition, BT2 (shown as a dotted line) is a backup tunnel from head-end node P2 through P4 to tail-end node PE3 (NNHOP to IP2). Prior to any change in the state of P3 (e.g., prior to failure), conventional routing (e.g., using label switched routing along the TE-LSP T1, or IP routing using routing table 600) is employed by the PLR. The backup tunnels stored in BRT 650 are "dormant" (unused) until needed, as described below.

According to the present invention, the PLR may be configured to notify the head-end node of the primary TE-LSP (as well as any intermediate TE-LSP nodes) that it is the penultimate hop to the tail-end node, and that it can protect the tail-end node accordingly (e.g., with established backup tunnels). This notification may be carried within an LSP-Attributes object of the RSVP-TE signaling messages, such as, e.g., in flags field 355 of Path message 300, or flags field 435 of Resv message 400.

Figure 8:
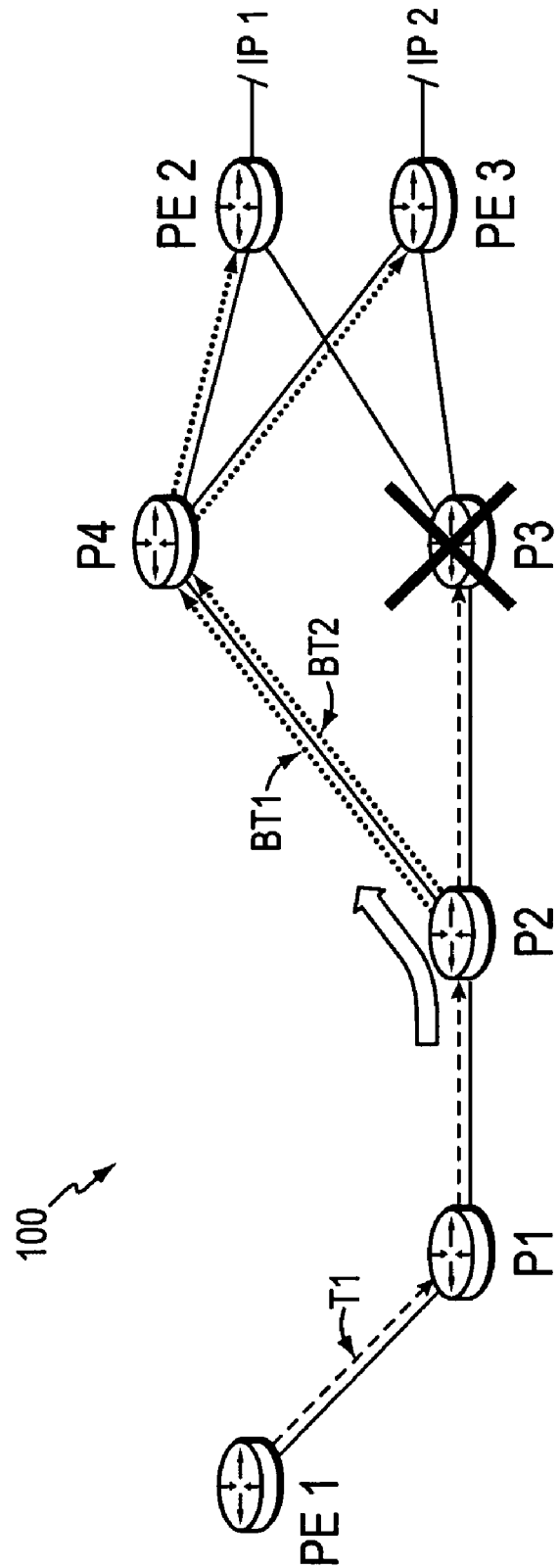
FIG. 8 is a schematic block diagram of an exemplary computer network as in FIG. 7 with a failed tail-end node in accordance with the present invention.

In accordance with another aspect of the present invention, once the PLR determines that the protected tail-end node has failed (e.g., as denoted by an "X" overlaid on P3 in FIG. 8), Fast Reroute (FRR) is triggered, and all traffic destined to a protected prefix is rerouted by the PLR (after performing a PHP operation) onto an appropriate backup tunnel to a corresponding NNHOP, e.g., according to the BRT. The PLR detects a failure of the protected tail-end node through any known link or node failure detection technique, such as layer 2 failure detection and/or any keep-alive protocol (e.g., IGP or Bi-directional Forwarding Detection, BFD), the latter of which detects, generally, the presence or absence of a connection signal or "heartbeat." Other MPLS TE-LSP failure detection techniques may also be used, such as state refreshing, etc.

According to the invention, once Fast Reroute has been triggered, the PLR determines whether incoming traffic originated from the TE-LSP Ti (i.e., through the protected tail-end node P3). Upon receiving the TE-LSP traffic, the PLR uses the BRT 650 for the traffic in response to a flag, a pointer, or other indicating means, indicating that the PLR should route in accordance with the backup situation. Traffic that is bound for a prefix beyond the protected tail-end node (e.g., IP1 or IP2), is rerouted onto the corresponding backup tunnels in the respective shadow table entry 660a or 660b, such as in backup tunnel reference field 664 (backup tunnel 1 or 2) to the NNHOPs (PE2 or PE3).

Illustratively, a traffic packet along the TE-LSP T1 that is destined for a prefix previously reachable via the failed tail-end node is encapsulated by the PLR P2 into a backup tunnel packet (a tunnel label is appended or "pushed" onto the packet), which is rerouted onto the backup tunnel corresponding to the tunnel label (e.g., BT1). Once the backup tunnel tail-end node (e.g., PE2) receives the tunnel packet, it removes ("pops") the tunnel label, and routes the traffic packet according to conventional routing (e.g., to IP1). Notably, the PLR P2 may first perform a PHP operation to ensure that the appropriate next-hop receives the traffic without a TE-LSP label referencing the primary TE-LSP, of which the backup tunnel tail-end node has no knowledge. Note also that the penultimate node of the backup tunnel (e.g., P4) may perform a PHP operation, thus removing the label of the backup tunnel.

Also, once Fast Reroute is triggered, the PLR P2 may notify the TE-LSP head-end node PE1 that tail-end node protection has been triggered, such as in a PathErr message 500. Notably, a novel error code/value may be used within Error Code field 537 and/or Error Value field 539 to indicate the tail-end node protection. Those skilled in the art will understand that a Path Error State Removal (PESR) flag (not shown) within the PathErr message 500 may be used to indicate to intermediate TE-LSP nodes that the TE-LSP T1 need not be immediately torn down (e.g., the PESR flag is cleared). Moreover, the PLR continues to refresh the state of the TE-LSP Ti, e.g., through RSVP-TE signaling messages as described above. However, due to the fact that the tail-end node P3 of the TE-LSP has failed, the PLR does not refresh the downstream state of the TE-LSP. Particularly, the downstream path of the TE-LSP (previously to the failed tail-end node) now traverses a backup tunnel to a NNHOP with no knowledge (i.e., no state) of the primary TE-LSP T1, so a refresh message along the backup tunnel for the primary TE-LSP is unwanted. In essence, the PLR has become a pseudo tail-end node of the primary TE-LSP T1, with continuing service over the backup tunnels to the desired destination address prefixes.

Upon learning of the tail-end node failure, the head-end node (PE1) of the TE-LSP (T1) may attempt to create or use an alternate TE-LSP to reach the protected prefixes, or revert to native (IP) routing if no TE-LSP is available. Particularly, as understood by those skilled in the art, a conventional TE-LSP reroute operation is configured to utilize the existing tail-end node. Since the tail-end node is no longer operational, the head-end node uses an alternate TE-LSP (new or previously established) to a diverse tailend node or native routing (e.g., after convergence) to route the traffic, and tear down the existing TE-LSP to the failed tail-end node. Also, in the event the head-end node tears down the protected TE-LSP, the PLR may tear down the corresponding backup tunnel(s) and revert to native routing.

Figure 9:
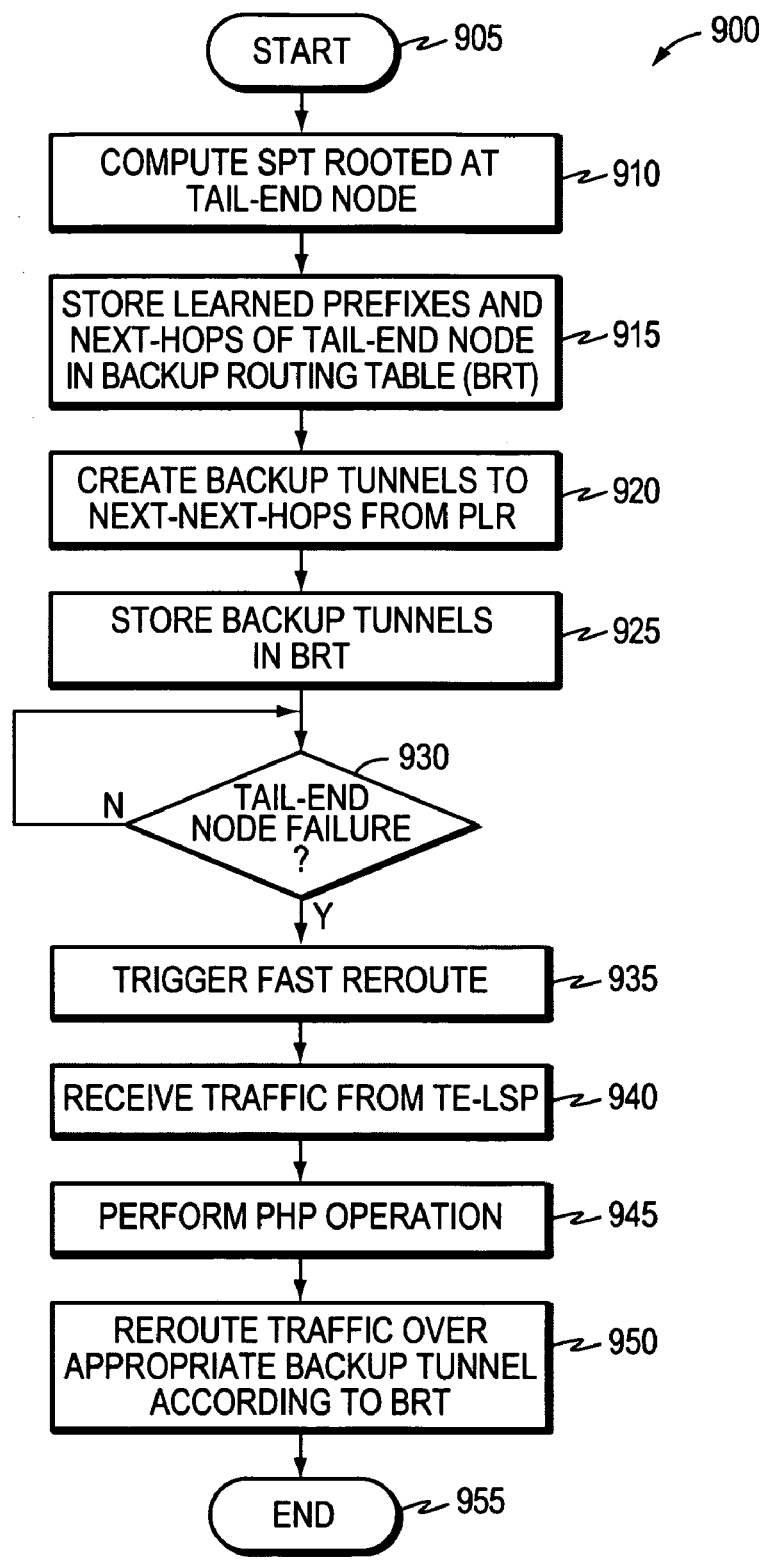
FIG. 9 is a flowchart illustrating a sequence of steps for protecting against a failure of a TE-LSP tail-end node in accordance with the present invention.

FIG. 9 is a flowchart illustrating a sequence of steps for protecting against a failure of a TE-LSP tail-end node in accordance with the present invention. Sequence 900 starts at step 905 and continues to step 910 where the PLR (P2) computes an SPT rooted at the tail-end node (P3) of an established TE-LSP (T1). In step 915, the PLR stores the learned prefixes (IP1 and IP2) and next-hops (PE2 and PE3, respectively) of the tail-end node within the BRT. Once the SPT is completed and stored in the BRT, the PLR accordingly creates backup tunnels (BT1 and BT2) to each NNHOP (PE2 and PE3, respectively) in step 920, and stores the backup tunnels in the BRT in step 925. The PLR performs MPLS routing over the TE-LSP in a conventional manner until it detects a tail-end node failure in step 930, at which time the PLR triggers FRR in step 935. Once FRR is triggered, as the PLR receives traffic traversing the TE-LSP in step 940, it performs a PHP operation to remove the TE-LSP label (for T1) in step 945, and reroutes the traffic over the appropriate backup tunnel according to the BRT in step 950. The sequence then ends in step 955. Notably, FRR continues at the PLR until the head-end node (PE1) of the TE-LSP (T1) tears down the TE-LSP, until the tail-end node is restored, or other reasons, as described above.

Advantageously, the novel technique protects against the failure of a tail-end node of a TE-LSP in a computer network using Fast Reroute and backup tunnels. By creating backup tunnels between PLR and NNHOP routers, the inventive technique provides Fast Reroute protection of the tail-end node that requires minimal configuration and avoids the deployment of TE-LSPs and/or backup tunnels from head-end nodes to every next-hop of the tail-end node (NNHOPs of the PLR), particularly if MPLS TE is used for fast recovery.

While there has been shown and described an illustrative embodiment that protects against failure of a tail-end node of a TE-LSP in a computer network, it is to be understood that various other adaptations and modifications may be made within the spirit and scope of the present invention. Notably, the invention has been shown and described herein using a core network architecture with P and PE routers. However, the invention in its broader sense is not so limited, and may, in fact, be used with any TE-LSP and corresponding TE-LSP tail-end node. Moreover, while the above description describes performing the technique at the PLR, which is the penultimate hop, the invention may also be advantageously used with PCEs. In addition, while one example of a tunnel is an MPLS TE-LSP, other known tunneling methods include, inter alia, the Layer Two Tunnel Protocol (L2TP), the Point-to-Point Tunneling Protocol (PPTP), and IP tunnels.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for protecting against failure of a tail-end node of a Traffic Engineering (TE) Label Switched Path (LSP) in a computer network, the method comprising:
    learning, at a point of local repair (PLR) along the TE-LSP, reachable address prefixes of next-hop routers from the tail-end node (NNHOPs);
    creating a backup tunnel from the PLR to each NNHOP that excludes the tail-end node;
    associating each backup tunnel with one or more learned address prefixes; and
    in response to failure of the tail-end node, i) performing a penultimate hop popping (PHP) operation on traffic received along the TE-LSP at the PLR, and ii) rerouting the received traffic at the PLR onto an appropriate backup tunnel to an NNHOP corresponding to a destination prefix of the traffic.

2. The method as in claim 1, further comprising:
    computing a shortest path tree (SPT) rooted at the tail-end node to learn the address prefixes.

3. The method as in claim 1, further comprising:
    storing the learned address prefixes in a backup routing table (BRT) at the PLR.

4. The method as in claim 1, further comprising:
    storing the backup tunnels in a backup routing table (BRT) at the PLR.

5. The method as in claim 1, further comprising:
    ceasing to refresh the downstream state of the TE-LSP in response to failure of the tail-end node.

6. The method as in claim 1, further comprising:
    receiving notification that the TE-LSP is to be torn down;
    tearing down the TE-LSP; and
    tearing down the backup tunnel to each NNHOP in response to the TE-LSP being torn down.

7. A system for protecting against failure of a tail-end node of a Traffic Engineering (TE) Label Switched Path (LSP) in a computer network, the system comprising:
    one or more next-hop routers from the tail-end node (NNHOPs); and
    a point of local repair (PLR) along the TE-LSP; the PLR adapted to
        i) learn reachable address prefixes of the NNHOPs,
        ii) create a backup tunnel to each NNHOP that excludes the tail-end node,
        iii) associate each backup tunnel with one or more learned address prefixes, and
        in response to failure of the tail-end node, iv) perform a penultimate hop popping (PHP) operation on traffic received along the TE-LSP, and v) reroute the received traffic onto an appropriate backup tunnel to an NNHOP corresponding to a destination prefix of the traffic.

8. The system as in claim 7, further comprising:
    a head-end node of the TE-LSP; and
    a signaling message sent from the PLR to the head-end node, the signaling message indicating to the head-end node that the PLR is capable of protecting the tail-end node.

9. The system as in claim 7, further comprising:
    a head-end node of the TE-LSP; and
    a signaling message sent from the PLR to the head-end node in response to failure of the tail-end node, the signaling message indicating to the head-end node that the PLR is currently protecting the tail-end node.

10. A node for protecting against failure of a tail-end node of a Traffic Engineering (TE) Label Switched Path (LSP) in a computer network, the node comprising:
    a network interface to receive traffic along the TE-LSP;
    a memory adapted to store i) learned reachable address prefixes of next-hop routers from the tail-end node (NNHOPs), and ii) backup tunnels created to each NNHOP that excludes the tail-end node, wherein each backup tunnel is associated with one or more learned address prefixes; and
    a processor adapted to i) perform a penultimate hop popping (PHP) operation on the received traffic, and ii) in response to failure of the tail-end node, reroute the received traffic onto an appropriate backup tunnel to an NNHOP corresponding to a destination prefix of the traffic.

11. The node as in claim 10, further comprising:
    a backup routing table (BRT) within the memory adapted to store learned address prefixes and backup tunnels.

12. The node as in claim 10, wherein the processor is further adapted to learn the address prefixes reachable from the NNHOPs.

13. The node as in claim 10, wherein the processor is further adapted to create the backup tunnels to the NNHOPs.

14. The node as in claim 10, wherein the network interface is further adapted to receive state refresh messages for the TE-LSP from upstream nodes along the TE-LSP, and in response to failure of the tail-end node, the network interface adapted to return the state refresh messages to the upstream nodes without forwarding the state refresh messages downstream to the tail-end node.

15. An apparatus for protecting against failure of a tail-end node of a Traffic Engineering (TE) Label Switched Path (LSP) in a computer network, the apparatus comprising:
    means for learning, at a point of local repair (PLR) along the TE-LSP, reachable address prefixes of next-hop routers from the tail-end node (NNHOPs);
    means for creating a backup tunnel from the PLR to each NNHOP that excludes the tail-end node;
    means for associating each backup tunnel with one or more learned address prefixes; and
    in response to failure of the tail-end node, i) means for performing a penultimate hop popping (PHP) operation on traffic received along the TE-LSP at the PLR, and ii) means for rerouting the received traffic at the PLR onto an appropriate backup tunnel to an NNHOP corresponding to a destination prefix of the traffic.

* * * * *

UNITED STATES PATENT AND TRADEMARK OFFICE
CERTIFICATE OF CORRECTION

PATENT NO. : 7,586,841 B2
APPLICATION NO. : 11/141567
DATED : September 8, 2009
INVENTOR(S) : Jean-Philippe Vasseur It is certified that error appears in the above-identified patent and that said Letters Patent is hereby corrected as shown below:

Col. 12, Line 20, please replace "is denoted as Associated" with "is denoted as "Y." Associated"

Col. 13, Line 35, please replace "TE-LSP Ti" with "TE-LSP T1"

Col. 14, Line 3, please replace "LSP Ti" with "LSP T1"

Signed and Sealed this
Twenty-ninth Day of March, 2011

David J. Kappos
*Director of the United States Patent and Trademark Office*